(12) United States Patent
Huo et al.

(10) Patent No.: US 6,632,767 B2
(45) Date of Patent: Oct. 14, 2003

(54) STABILIZATION OF MOLECULAR SIEVES BY SALT ADDITION

(75) Inventors: Qisheng Huo, East Amherst, NY (US); Neil Andrew Stephenson, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 70 days.

(21) Appl. No.: 09/739,280

(22) Filed: Dec. 19, 2000

(65) Prior Publication Data

US 2002/0119887 A1 Aug. 29, 2002

(51) Int. Cl.[7] .................................................. B01J 29/06
(52) U.S. Cl. ............................. 502/64; 502/60; 502/65; 502/66
(58) Field of Search ............................. 502/64, 65, 66, 502/73, 74, 60

(56) References Cited

U.S. PATENT DOCUMENTS

| 3,140,253 | A | * | 7/1964 | Plank et al. ............ 208/120.15 |
| 3,875,290 | A | * | 4/1975 | Gring ........................... 423/700 |
| 4,061,717 | A | | 12/1977 | Kerr et al. |
| 4,308,129 | A | * | 12/1981 | Gladrow et al. ....... 208/120.15 |
| 5,053,372 | A | * | 10/1991 | Brownscombe .............. 502/60 |
| 5,194,244 | A | * | 3/1993 | Brownscombe et al. .... 423/700 |
| 5,277,793 | A | | 1/1994 | Bezman et al. |
| 5,382,420 | A | | 1/1995 | Vaughan |
| 5,389,357 | A | | 2/1995 | Sato et al. |

OTHER PUBLICATIONS

Fritz Haber Institute of Max Planck Society, pp PL4–1 — PL4–24 Hellmut G. Karge, "Post–Synthesis Modification of Microporous Materials by Solid–Reactions," No Date Available.

* cited by examiner

Primary Examiner—Tom Dunn
Assistant Examiner—Christina Ildebrando
(74) Attorney, Agent, or Firm—Robert J. Follett

(57) ABSTRACT

The low stability of some molecular sieves can be overcome during calcination by a solid state reaction between the molecular sieve and a salt. Molecular sieves including zeolites, metal substituted aluminosilicates, and metallosilicates can be stabilized by this method. The inventive process comprises mixing such molecular sieve with a salt, either directly or as a slurry; and then heating the resulting mixture to remove water, organics and adsorbed species.

6 Claims, 2 Drawing Sheets

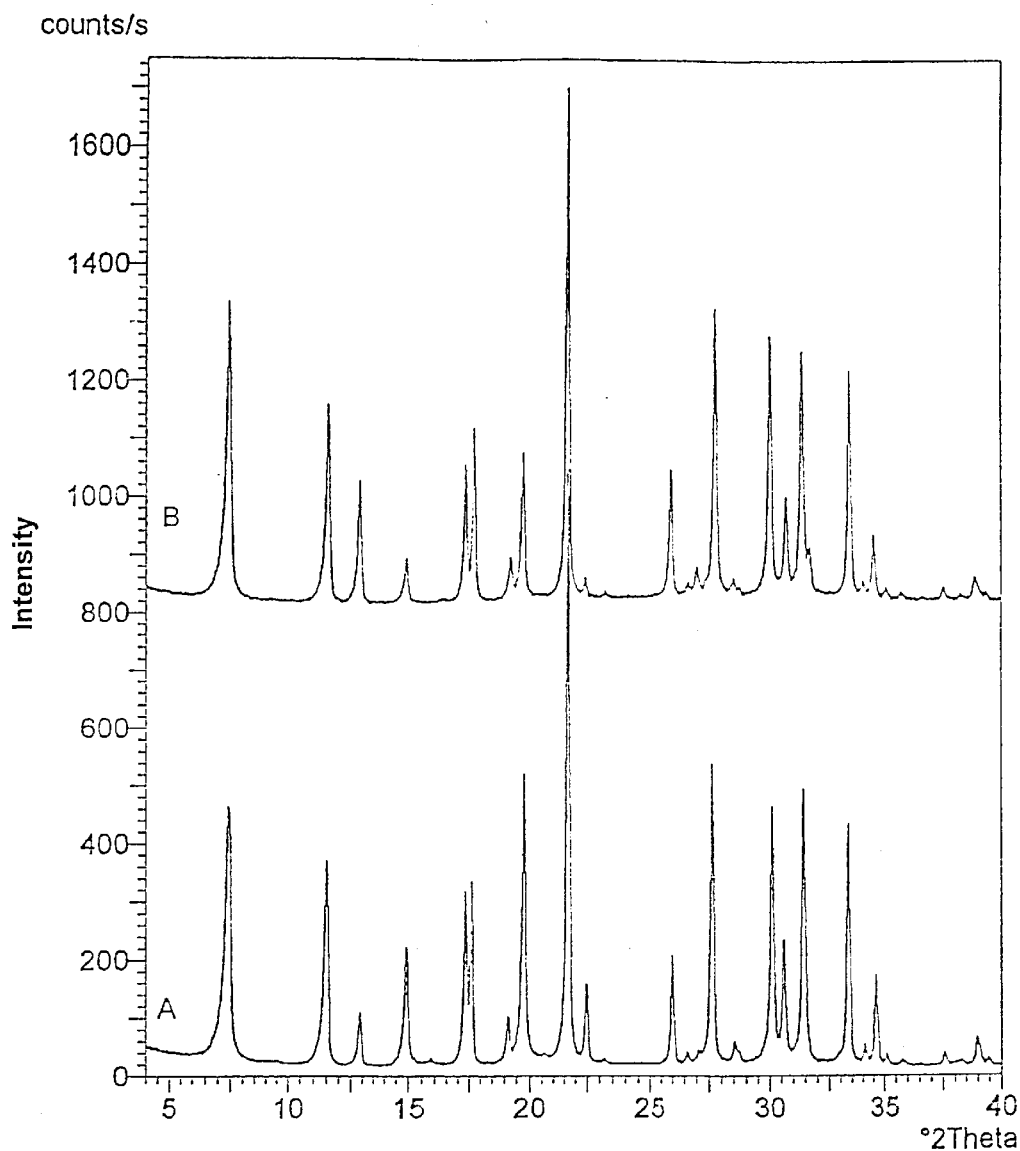
Fig 1. the CuKα radiation X-ray diffraction patern of gmelinite. (A) as-made Na-form gmelinite (with template); (B) calcined gmelinite.

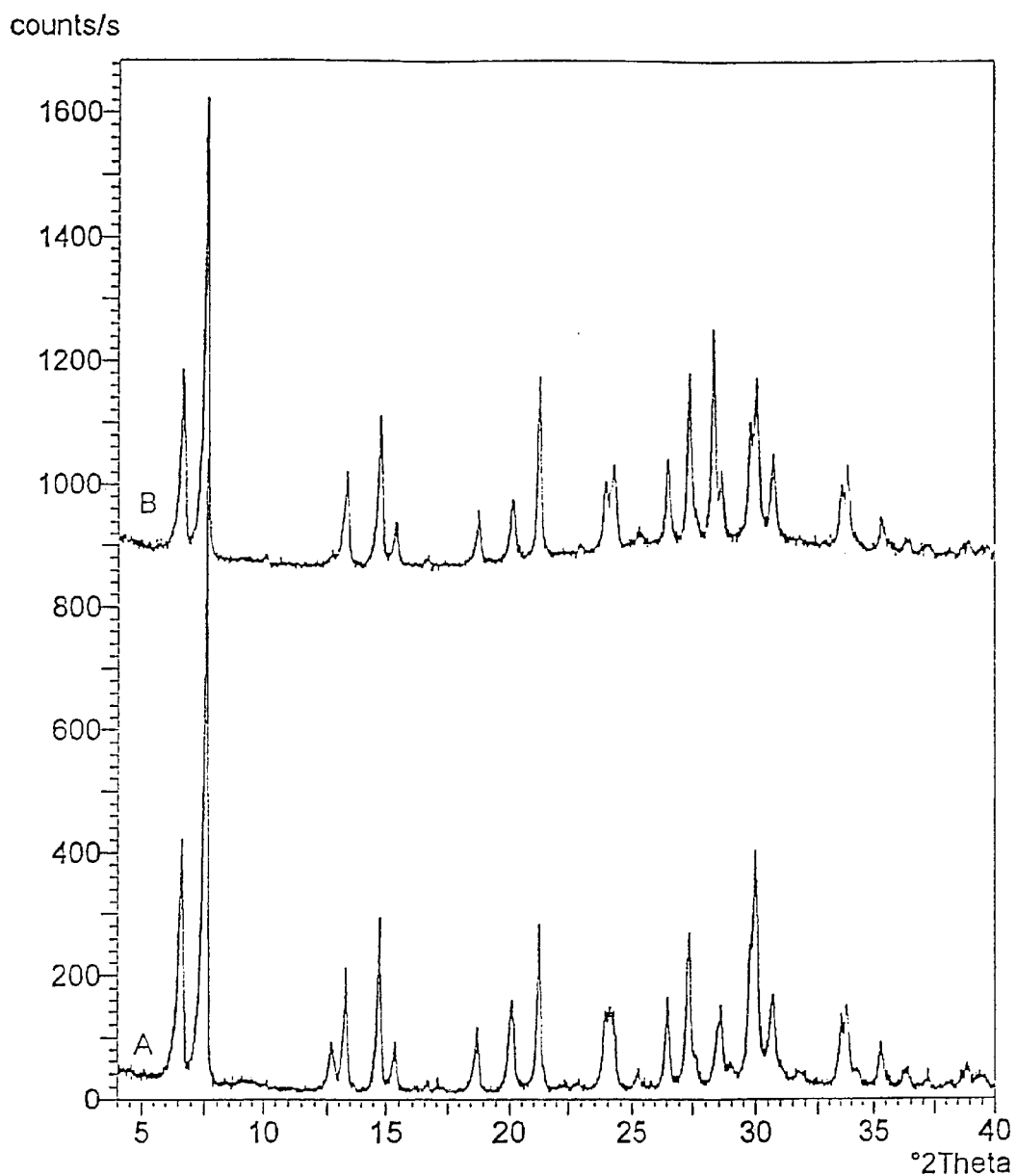
Fig 2. the CuKα radiation X-ray diffraction patern of Linde Q. (A) as-made K-form Linde Q (hydrate); (B) dehydrated Linde Q.

STABILIZATION OF MOLECULAR SIEVES BY SALT ADDITION

FIELD OF THE INVENTION

This invention relates to molecular sieves that exhibit low inherent thermal stability, whereby removal of water or their organic template therefrom during calcination results in a collapse of their framework structure. More particularly, the invention relates to a method for overcoming the low stability of certain of these materials via a solid state reaction of such material with a salt.

BACKGROUND OF THE INVENTION

Zeolites, both natural and synthetic, are microporous crystalline aluminosilicate materials of variable composition and are characterized by a 3-dimensional structure that contains channels and/or cages of molecular dimensions. Zeolites are differentiated from each other by their composition and structure. Most zeolites are assigned structure type codes of three letters, e.g., FAU for zeolite X, GME for gmelinite, and BPH for Linde Q. Characteristics, composition and structure determine the physical and chemical properties of each zeolite and their application to different industrial processes. An organic additive (e.g. tetraalkylammonium cation), commonly called a template, is needed for the formation of some molecular sieves.

The thermal stability of molecular sieve frameworks varies considerably, with many materials being unable to retain their framework intact once water and/or its organic template is removed during calcination.

Thus while a large number of aluminosilicate zeolites may be reversibly dehydrated with only minor distortions of the framework, others are dependent on occluded water molecules in order to retain their framework.

The reasons for the instability of these molecular sieves during calcination are not completely understood. The following are considered as the main factors: (1) template, hydrated cation or water molecules stabilize the high energy structural units rings or cages; and thus removal of these from the structure during calcination results in structural collapse (2) protons formed by decomposing organic templates destroy the framework structures, particularly for aluminum-rich zeolites; (3) cations, which balance framework negative charges, occupy wrong locations or have a wrong size or charge density to stabilize the building units in dehydrated frameworks.

The following are examples of zeolites that require improved thermal stability during calcination in order for them to be suitable for practical applications. Gmelinite (GME) is a well-known aluminosilicate zeolite, having a structure in which the main feature is a large 12-ring channel. Gmelinite (GME) exists naturally as a mineral, and can also be synthesized from an all inorganic mixture in the laboratory. Both natural and synthetic gmelinites behave like small-pore zeolites due to the intergrowth with chabazite, another zeolite, or structure faults. Chabazite-free gmelinite has been synthesized using a polymeric template synthesis system (see U.S. Pat. No. 4,061,717 and Daniels et al., *JACS*, 3097, 1978). Gmelinite (GME) prepared according to the Daniels et al. method undergoes degradation and loss of crystal quality on calcination.

Linde Q (BPH) was first synthesized in 1961 (see U.S. Pat. No. 2,991,151) and has been designated zeolite K-I and zeolite Q. Zeolite K-I can be made using kaolinite as source to give a composition of $K_2O:Al_2O_3:2SiO_2:4H_2O$. In situ monitoring by X-ray diffraction reveals that K-I decomposes at 168° C. before loss of all zeolitic water.

Linde Q shows major structural collapse on dehydration at temperatures as low as 240° C. This degradation has severely limited possible applications and is unusual among aluminosilicate zeolites, most of which are stable to dehydration. Linde Q would have useful catalytic and sorption properties, if it could maintain its framework structure during calcination.

The most common strategy for increasing the thermal stability of thermally unstable zeolites (e.g. those zeolites unable to retain their framework during calcination) is to increase the framework Si/Al ratio. This can achieved by the following methods or combinations thereof: (1) steam treatment at high temperature resulting in dealumination of the framework (e.g., U.S. Pat. No. 4,724,067); (2) treating the zeolite with an organic or inorganic acid to dissolve some framework aluminum (e.g., U.S. Pat. Nos. 4,724,067; 4,909,924; 5,389,357); (3) treatment of the zeolite with a solution of a fluorine compound (e.g., U.S. Pat. No. 3,933,983); (4) treating the zeolite with a silicon-containing compound to replace aluminum with silicon (e.g., U.S. Pat. Nos. 5,389,357 and 5,236,877); and (5) treating the zeolite with a dealuminating agent, such as, EDTA.

U.S. Pat. No. 5,277,793 provides an improved hydrocracking catalyst Y-type which comprises less than about 0.5 wt. % alkaline metal oxide and which contains an effective amount of oxometallic cations positioned in the beta-cages of the zeolite. This substantially stabilizes the zeolite against thermal degradation and is a special case for improving the thermal stability of zeolite Y. Another effective method for increasing the thermal stability of crystalline zeolites is by introduction of rare earth cations into the pores or cages of the zeolite. In U.S. Pat. No. 4,701,431, a rare earth stabilized aluminum deficient zeolite having the structure of faujasite is provided.

Ion exchanging the zeolite with a specified amount of rare earth metal cations also stabilizes the aluminum deficient zeolite. U.S. Pat. No. 5,382,420 shows that a rare-earth exchanged form of zeolite Q has high thermal stability. However, some of the rare earth ions are not removeable, and a minimum quantity must be maintained to prevent collapse of their framework structure.

Unfortunately, for those materials that would be useful as $N_2$ selective zeolite adsorbents the above methods are generally undesirable. This is because such zeolites preferably would include lithium and have a low Si/Al ratio.

It is therefore an object of the invention to stabilize structures that were previously thought to be unstable.

It is another object of the invention to overcome the low inherent stability of certain molecular sieves so that water can be removed therefrom without collapse of the framework structure.

It is a further object of the invention to overcome the low stability of certain molecular sieves by a solid state reaction with a salt.

SUMMARY OF THE INVENTION

The low stability of certain molecular sieves during calcination can be overcome by combining the molecular sieve with a salt. This process may be used effectively for zeolites, metal substituted aluminosilicates where the metal is one or more of Zn, Fe, Ga, Ge, Co, Ti, Ni and Mn, and metallosilicates where the metal is one or more of Zn, Fe, Ga, Ge, Co, Ti, Ni and Mn. Thus, the method of the invention provides for the formation of certain molecular sieves that are remain structurally stable during calcination despite water or template removal therefrom.

In a preferred process of the invention, the molecular sieve is mixed with a salt, either directly or as a slurry; and then heated/calcined to remove at least one of water, organics, and adsorbed species. While not wishing to be bound by any theory, it is our belief that the improved stability results from either a solid-state ion-exchange of protons formed on calcination, or compensation for high framework charge within the sieve.

BRIEF DESCRIPTION OF THE DRAWINGS

FIG. 1 is a plot of Intensity versus 2Theta for CuK radiation X-ray diffraction pattern of gmelinite (A) as-made Na-form gmelinite (with template); (B) calcined gmelinite.

FIG. 2 is a plot of Intensity versus 2Theta for CuK radiation X-ray diffraction pattern of Linde Q. (A) as-made K-form Linde Q (hydrate); (B) dehydrated Linde Q.

DETAILED DESCRIPTION OF THE INVENTION

This invention comprises a method to stabilize certain molecular sieve materials (including zeolites, certain metal substituted aluminosilicates and certain metallosilicates) by mixing such materials with one or more salts prior to calcination. : The molecular sieve may have a pore size between 3.5 and 100 Angstroms, and the zeolites may have a Si/Al ratio from 1 to 100.

More specifically, an as-made thermally unstable molecular sieve and one or more salts, which contain a cation, are mixed either directly as a slurry, where, in the latter process, a small amount of water or other solvent is added in order to mix the sieve and salt(s) completely.

The cations associated with the salt may be alkaline, alkaline earth, transition, or rare earth metals, alkylammonium, or mixtures thereof.

The anions associated with the impregnated salt, are either halides (preferably chloride), nitrate, sulfate, phosphate, carboxylates or mixtures thereof. Table 1 below sets forth preferred salts.

TABLE 1

Preferred Salts

| Cations | Anions |
|---|---|
| Li, Na, K, Rb, Cs | Halide |
| Be, Mg, Ca, Sr, Ba | Nitrate, phosphate |
| Al, Ga, In | Carbonate, |
| Cr, Mn, Fe, Co, Ni, Cu, | bicarbonate |
| Zn | Sulfate |
| Ag, Cd | Borate, silicate |
| Ru, Rh, Pd, Pt, Au, Hg | Carboxylate, |
| La, Ce, Pr, Nd, Pm, Sm, | sulfonate |
| Eu, Gd | Alcoholate, |
| $R_{4-n}N^+H_n$, where R = alkyl, n = 0–4 | phenolate |

In general, the salts should be comprised of combinations of cations and anions in proportions required to maintain electrical neutrality. Mixtures of salts are also usable. The choice of salt required depends on individual framework structure and composition. As a general consideration, the salt should not be reactive with the molecular sieve framework under the conditions used. Also, the dimensions of the salt component ions should allow for its transport into the pore structure.

In examples where the salt required for structure stabilization has an adverse effect on adsorption or catalytic properties, the salt content should be minimized. When salt impregnation is desirable for adsorption or catalytic properties, the salt identity and content should address the final application. For example, in addition to framework stabilization, salts can be used to provide acidic or basic sites for catalysis, chemisorption sites for improved selectivity, or additional adsorption sites. As such their removal from the sieve during calcination should be minimized.

The amount of salt needed for stabilization depends on the salt used, but should be at least 5 weight percent.

In a specific example, where the unstable molecular sieve is sodium, lithium, or potassium exchanged Linde Q (BPH topology), the added salt may be one of NaCl, KCl, LiCl, $LiNO_3$, $Na_2CO_3$, or NaOAc. In another example, the molecular sieve is lithium, or sodium exchanged GME, and the added salt may be NaCl, KCl, or KCl.

Once the salt and sieve have been mixed, the mixture should dried slowly then heated to remove water, organics, and adsorbed species using an inert gas (i.e. nitrogen) or an oxygen containing gas stream (i.e. air). The process may also be run under a vacuum.

The heating/calcination step may be performed under a wide range of conditions depending on the molecular sieve composition and structure. For aluminosilicate zeolites, the calcination temperatures should be from 300° C. to 800° C., preferably from 400° C. to 550° C. For water removal, heating to 350° C. is required; template removal, temperatures up to 500° C. are necessary.

The heating rate and calcination time have do not have a significant effect on reaction results and will depend upon the particular compositions being treated. Preferably, the heating rate is 0.1° C. to 10° C. per minute and, more preferably, 0.5° C. to 5° C. per minute. The heating time is preferably 0.1 to 60 hours and, more preferably, from 4 to 24 hours.

Similar processing conditions can be used for other molecular sieves besides zeolites.

The process as applied to a zeolite is summarized in Table 2. These process steps are also generally applicable to metal substituted aluminosilicates, and metallosilicates discussed above.

TABLE 2

Summary of Process Steps

| Process | | Result |
|---|---|---|
| 1a. | synthesize zeolite | Obtain zeolite parent |
| 1b. | mix zeolite and salt, either directly or as a slurry | Obtain a mixture of zeolite and salt |
| 2. | Heat the mixture | Remove water, organics, and adsorbed species from zeolite |

When the role of salt does not involve stabilization with respect to desolvation, the excess salt or salts can be removed, following calcination, by solvent (i.e. water) rinse or in a combination with ion-exchange and subsequent desolvation. To simplify synthetic routes, and to address compositions where instability with respect to desolvation precludes removal of salt in a separate rinse step, the salt used for stabilization should be thermally removable. This typically involves stabilization of the salt at temperatures required for template removal and/or desolvation, followed by subsequent removal at higher temperatures by sublimation or thermal decomposition. This is particularly the case for tetraalkylammonium salts.

A comparison between results of this invention and the prior art are listed in Table 3.

TABLE 3

Zeolite Thermal Stability: A Comparison

| Prior Art | The Invention (heating zeolite with salt) |
|---|---|
| Increases the framework Si/Al ratio | Does not change the framework Si/Al ratio |
| Introduces rare earth ions | Any cation can be used |
| Solid state reaction with salt is for the purpose of ion-exchange of cations of zeolite | Heating with a salt stabilizes the zeolite structure |
| Linde Q collapses below 200 C. | Linde Q is stable up to 600 C. when treated with a salt |

As described in more detail below, salt stabilization has been successfully applied to gmelinite and Linde Q (BPH). Calcination of as-made Na- or Li—gmelinite at 400–600° C. under N2 or air results in a zeolite with AFI structure. On the other hand, the calcination of a mixture of as-made gmelinite containing polymeric template and sodium, with LiCl, NaCl or KCl, gives a GME structure without phase transition to AFI (another zeolite structure type).

An as made Linde Q (BPH) framework collapses between 100° C. to 200° C. before dehydration. The calcination of a mixture of as-made Linde Q with LiCl, NaCl, KCl, LiNO$_3$, NaOAc, NH$_4$Cl or TMACl (tetramethylammonium chloride) at 600° C. yielded a BPH structure that does not collapse after calcination. Thus, when these as-made materials are calcined with certain salts, as described, their stability is improved so as to enable removal of template or water from the framework without destruction of the structure.

Powder X-ray diffraction (XRD) was used to compare "as-made" materials treated according to the process of the invention with untreated "as-made" materials. The XRD pattern was recorded by plotting diffraction intensity vs. 2 theta, where theta is the diffraction angle between an incident monochromatic X-ray beam and crystal lattice planes. Powder XRD is widely used for the identification, quantitative determinations and characterization of ordered phases such as zeolites. Since a typical XRD pattern is obtained for each crystalline phase, the pattern may be regarded as a "fingerprint" of the respective material. The identities of specific patterns are determined by reference to known examples of specific framework topologies (XRD fingerprints). Purity can be assessed by comparison of intensities and broadness of individual signals, and presence of signals that do not coincide with the fingerprint.

The traces in FIGS. 1 and 2 show signals at specific diffraction angles corresponding to crystal structure: long range ordering of atoms. FIG. 1 and FIG. 2 show XRD patterns for gmelinite (GME) and Linde Q (BPH), respectively. All peaks come from the zeolite. The narrow peaks and straight baseline indicate that the material has high purity and crystallinity. Most peaks keep the their intensities and 2 theta position after calcination, which means that the material still has the same structure and crystallinity.

The minor intensity and 2 theta changes for certain peaks result from the effect of removal of template or water on framework structure. If a crystalline solid is thermally unstable, its XRD pattern will change after calcination: intensities of peaks dramatically decrease (evidence of crystallinity loss), and even disappear (evidence of framework collapse), or a new set of peaks appears (evidence of phase transformation).

Table 4 summarizes the results of the experiments described in detail below.

TABLE 4

Summary of Experiments

| Purpose | Example No. | Purpose And Result |
|---|---|---|
| Stabilize GME | example 1 | Synthesize template Dab-4Br and gmelinite |
| | example2 | Calcine gmelinite with salt (LiCl, NaCl or KCl), obtain template-free gmelinite |
| Stabilize Linde Q | example3 | Synthesize Linde Q |
| | example4 | Dehydrate Linde Q by heating with salt (NaCl, KCl, LiNO$_3$, NaOAc or LiCl) |
| | example5 | Dehydrate Linde Q by heating with salt (TMACl) |

EXAMPLE 1

Synthesis of As-made Gmelinite

The polymeric quaternary ammonium template, Dab-4Br, was synthesized by reaction of 1,4-diazabicyclo [2.2.2] octane (DABCO) with Br(CH$_2$)$_4$Br in methanol at room temperature for 30 days.

A gel composition of 5.42 Dab-4Br: 1 Al$_2$O$_3$: 16.7 Na$_2$O: 30 SiO$_2$: 570 H$_2$O was prepared by first making a sodium aluminate solution (0.4 mol/kg Al$_2$O$_3$ and 4 mol/kg NaOH) by dissolving aluminum hydroxide hydrate (54% Al$_2$O$_3$, Aldrich) in a solution of NaOH. 25.0 g of sodium aluminate solution and 54.2 g of template Dab-4Br solution (16.4 wt. %) were mixed, then 66.6 g of sodium silicate solution (27% SiO$_2$, 14% NaOH, Aldrich) was added.

The reaction mixture was stirred at room temperature for 5 minutes, the mixture was transferred to Teflon bottle, and heated for 7 days at 80° C. in a convection oven, then for 3 days at 90° C. The product was filtered, washed with water, then dried in an oven at 100° C. X-ray diffraction analysis showed high quality gmelinite (FIG. 1(A)).

EXAMPLE 2

Preparation of Template Free GME 8 g of sample of as-made gmelinite, prepared as described in Example 1, was mixed with 16.8 g of aqueous solution of LiCl (2 mol/kg). This mixture was heated from room temperature to 90° C. at 0.1° C./min, then heated to 500° C. at 0.5° C./min and held at 500° C. for 5 hours. On cooling, the product was washed with water, and dried in an oven at 100° C. X-ray diffraction analysis showed high quality gmelinite (FIG. 1(B)).

Use of similar amounts of NaCl, or KCl instead of LiCl, with the same general procedure as described above, gave high quality gmelinite product.

EXAMPLE 3

Synthesis of Linde Q

A gel composition of: 2.34 K$_2$O:1 Al$_2$O$_3$:2.06 SiO$_2$:85 H$_2$O was prepared by first making a potassium aluminate solution by dissolving 3.67 g of aluminum hydroxide hydrate (54% Al$_2$O$_3$, Aldrich) in a solution of KOH (6 g of KOH 85% in 23 g of water). To the potassium aluminate solution, 6 g of colloidal silica (Ludox HS-40) was added. The reaction mixture was stirred at room temperature for 5 minutes, the mixture was transferred to a Teflon bottle, and heated for 7 days at 90° C. in a convection oven. The product was filtered, washed with water and dried in an oven at 100° C. X-ray diffraction analysis showed that the product is Linde Q (BPH) (FIG. 2(A)).

EXAMPLE 4

Preparation of Linde Q (Water Free, With Residual Salt)

0.8 g of sample of as-made Linde Q, prepared as described in example 3, was mixed with 2 g of an aqueous solution of LiCl (2 mol/kg). This mixture was heated from room temperature to 400° C. at 0.2° C./min, and held at 400° C. for 4 hours. X-ray diffraction analysis showed that the product is Linde Q (BPH) (FIG. 2(B)).

Using a similar procedure with NaCl, KCl, LiNO$_3$, NaOAc in place of LiCl, resulted in X-ray diffraction analysis consistent with Linde Q after calcination at 400–600° C.

EXAMPLE 5

Preparation of Linde Q (Water Free, Without Residual Salt)

0.5 g of as-made Linde Q, prepared as described in Example 3, was mixed with 1 g of an aqueous solution of tetramethylammonium chloride (TMACl) (25 wt.%). This mixture was heated from room temperature to 600° C. at 0.2° C./min, and held at 400° C. for 4 hours. X-ray diffraction analysis showed that the product is Linde Q (BPH).

A similar procedure using NH$_4$Cl instead of TMACl also resulted in X-ray diffraction analysis consistent with Linde Q after calcination at 400–600° C.

SUMMARY

The low stability of certain molecular sieves can be overcome during heating by combining the molecular sieve and salt. While not wishing to be bound to any theory, it is our belief that the cation and/or anion from the salt occupies structural sites within the crystal structure of the molecular sieve, thus preventing the collapse or phase transition of the molecular sieve crystal structure by either a solid-state ion-exchange of protons formed on calcination, or by helping to compensate for high framework charge.

Unstable molecular sieves including zeolites, metal substituted aluminosilicates where the metal is one or more of Zn, Fe, Ga, Ge, Co, Ti, Ni and Mn, and metallosilicates where the metal is one or more of Zn, Fe, Ga, Ge, Co, Ti, Ni and Mn can be stabilized by this method.

The salt stabilized molecular sieve may be used for adsorptive separations of fluid mixtures, or in catalytic transformations.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for thermally stabilizing an unstable molecular sieve comprising the following steps:
   a) mixing the unstable molecular sieve with a salt, either directly or as a slurry; and
   b) heating the mixture that results from step a) to remove one or more of water, organics. and adsorbed species;
   wherein the unstable molecular sieve adsorbent is either a zeolite, a metal substituted aluminosilicate where the metal is one or more of Zn, Fe, Ga., Ge, Co, Ti, Ni and Mn, or a metallosilicate where the metal is one or more of Zn, Fe, Ga, Ge, Co, Ti, Ni and Mn;
   wherein said salt is a tetraalkylammonium salt; and
   wherein step b) comprises calcining the mixture at a temperature in a range of from 300° C. to 800° C., at a rate of heat increase of 0.1° C. to 10° C. per minute during a heating time of 0.1 to 60 hours and removing excess amounts of said salt from said unstable molecular sieve.

2. The method as recited in claim 1, wherein step b) is carried out in either the presence of an inert gas or oxygen or a vacuum.

3. The method as recited in claim 1, wherein the molecular sieve adsorbent has pore sizes between 3.5 and 100 Angstroms.

4. The method as recited in claim 1, wherein the unstable molecular sieve adsorbent is either a zeolite, a metal substituted aluminosilicate where the metal is one or more of Zn, Fe, Ga, Ge, Co, Ti, Ni and Mn, or a metallosilicate where the metal is one or more of Zn, Fe, Ga, Ge, Co, Ti, Ni and Mn.

5. The method as recited in claim 1 wherein step b) comprises calcining the mixture at a temperature in a range of from 400° C. to 550° C., at a rate of heat increase of 0.5° C. to 5° C. per minute and during a heating time of 4 to 24 hours.

6. The method as recited in claim 1 wherein the unstable molecular sieve is selected from the group consisting of: sodium, lithium, or potassium exchanged Linde Q (BPH topology).

* * * * *